United States Patent
Bane et al.

(10) Patent No.: US 10,483,714 B2
(45) Date of Patent: Nov. 19, 2019

(54) Q-SWITCHED LASER WITH STABILIZED OUTPUT ENERGY

(71) Applicant: SAAB AB, Linkoeping (SE)

(72) Inventors: Peter Bane, Kallered (SE); Marcus Gustafsson, Saevedalen (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/083,685

(22) PCT Filed: Mar. 30, 2016

(86) PCT No.: PCT/SE2016/050265
§ 371 (c)(1),
(2) Date: Sep. 10, 2018

(87) PCT Pub. No.: WO2017/171595
PCT Pub. Date: Oct. 5, 2017

(65) Prior Publication Data
US 2019/0131760 A1    May 2, 2019

(51) Int. Cl.
| | | |
|---|---|---|
| *H01S 3/13* | (2006.01) | |
| *H01S 3/136* | (2006.01) | |
| *H01S 3/137* | (2006.01) | |
| *H01S 3/131* | (2006.01) | |
| *H01S 3/115* | (2006.01) | |
| *H01S 3/117* | (2006.01) | |
| H01S 3/16 | (2006.01) | |
| H01S 3/17 | (2006.01) | |

(52) U.S. Cl.
CPC ............ *H01S 3/136* (2013.01); *H01S 3/115* (2013.01); *H01S 3/117* (2013.01); *H01S 3/131* (2013.01);
(Continued)

(58) Field of Classification Search
CPC .......... H01S 3/136; H01S 3/115; H01S 3/117; H01S 3/1305; H01S 3/1306; H01S 3/137;
(Continued)

(56) References Cited

U.S. PATENT DOCUMENTS

| 4,197,513 A | 4/1980 | Bell et al. |
|---|---|---|
| 5,339,323 A | 8/1994 | Hunter et al. |

(Continued)

FOREIGN PATENT DOCUMENTS

GB    2497549 A    6/2013

OTHER PUBLICATIONS

International Searching Authority (ISA), International Search Report and Written Opinion for International Application No. PCT/SE2016/050265, dated Jan. 10, 2017, 11 pages, Swedish Patent and Registration Office, Sweden.
(Continued)

*Primary Examiner* — Kinam Park
(74) *Attorney, Agent, or Firm* — Alston & Bird LLP (57) ABSTRACT

The present disclosure relates a laser arrangement (1) and a method of the laser arrangement, arranged to output energy in the form of laser emission, for emitting controlled Q-switched laser emission. The laser arrangement comprises a gain medium (2) arranged to be excited when pumped, an optical resonator (3), an active Q-switch (4) arranged in the optical resonator, said active Q-switch (4) being controllable between at least a high loss state and a low loss state, and being arranged to introduce loss in the optical resonator to prevent lasing in the high loss state and to affect lasing minimally in the low loss state, a photo detector (5) arranged to detect the presence of a free running pulse (1') generated by the optical resonator and which occurs when a lasing threshold is reached and a processing circuitry (6) arranged to control (S4) of the state of the active Q-switch based on the detection of the free running pulse.

16 Claims, 4 Drawing Sheets

(52) U.S. Cl.
CPC .......... *H01S 3/1305* (2013.01); *H01S 3/1306* (2013.01); *H01S 3/137* (2013.01); *H01S 3/1608* (2013.01); *H01S 3/1611* (2013.01); *H01S 3/1643* (2013.01); *H01S 3/17* (2013.01)

(58) Field of Classification Search
CPC ...... H01S 3/131; H01S 3/1608; H01S 3/1611; H01S 3/1643; H01S 3/17
See application file for complete search history.

(56) References Cited

U.S. PATENT DOCUMENTS

| | | | | |
|---|---|---|---|---|
| 6,490,299 | B1* | 12/2002 | Raevsky | B23K 26/0665 |
| | | | | 372/10 |
| 2004/0151217 | A1* | 8/2004 | Yeik | A61B 18/20 |
| | | | | 372/25 |
| 2006/0176913 | A1* | 8/2006 | Souhaite | H01S 3/113 |
| | | | | 372/10 |
| 2006/0222023 | A1* | 10/2006 | Eyres | H01S 3/115 |
| | | | | 372/10 |
| 2016/0003781 | A1* | 1/2016 | Ichihara | G01N 29/2418 |
| | | | | 73/643 |
| 2016/0276801 | A1* | 9/2016 | Spiekermann | H01S 3/09415 |

OTHER PUBLICATIONS

SAAB AB, Applicant's Informal Response to ISA's Jan. 10, 2017 Written Opinion, dated Nov. 28, 2017, 2 pages, Zacco Sweden AB, Sweden.

* cited by examiner

Q-SWITCHED LASER WITH STABILIZED OUTPUT ENERGY

CROSS REFERENCE TO RELATED APPLICATIONS

This application is a National Stage Application, filed under 35 U.S.C. § 371, of International Application No. PCT/SE2016/050265, filed Mar. 30, 2016; the contents of which as are hereby incorporated by reference in their entirety.

BACKGROUND

Related Field

The present disclosure relates to a device and a method for emitting controlled Q-switched laser emission. In particular the disclosure relates to a laser arrangement and a method of the laser arrangement, arranged to output energy in the form of laser emission, for emitting controlled Q-switched laser emission.

Description of Related Art

There are many different areas of technology that use lasers; such as in electronics, IT, science and medicine. Another common use is rangefinding using laser. The laser emission is then used to determine a distance to an object by, for example, the time of flight principle. A laser pulse is then sent towards the object and the time it takes to the pulse to be reflected off the object and returned is used to determine the distance.

A pulsed laser can for example be achieved by Q-switching. A variable attenuator is then placed inside the optical resonator of the laser arrangement. When the attenuator is active, light which leaves the gain medium does not return, i.e. there is high loss in the optical resonator, and lasing cannot occur. When the attenuator is inactive, it should affect lasing minimally. The Q-switch is set to high loss state when the gain medium is excited, i.e. pumped, and when the light cannot resonate in the optical resonator, a population inversion in the gain medium is produced. When the Q-switch is set to low loss state, a short pulse of Q-switched laser emission with very high intensity is output from the laser. The output energy is determined by the degree of excitation in the gain medium and losses in the resonator.

An example of a Prior Art Q-switch is an acousto-optic Q-switch which is placed in the optical resonator and when a radio frequency (RF) is directed at it, diffraction losses are introduced to prevent lasing in the optical resonator. By turning off the radio frequency directed at the acousto-optic Q-switch, the introduced optical losses are removed.

Figure 1:
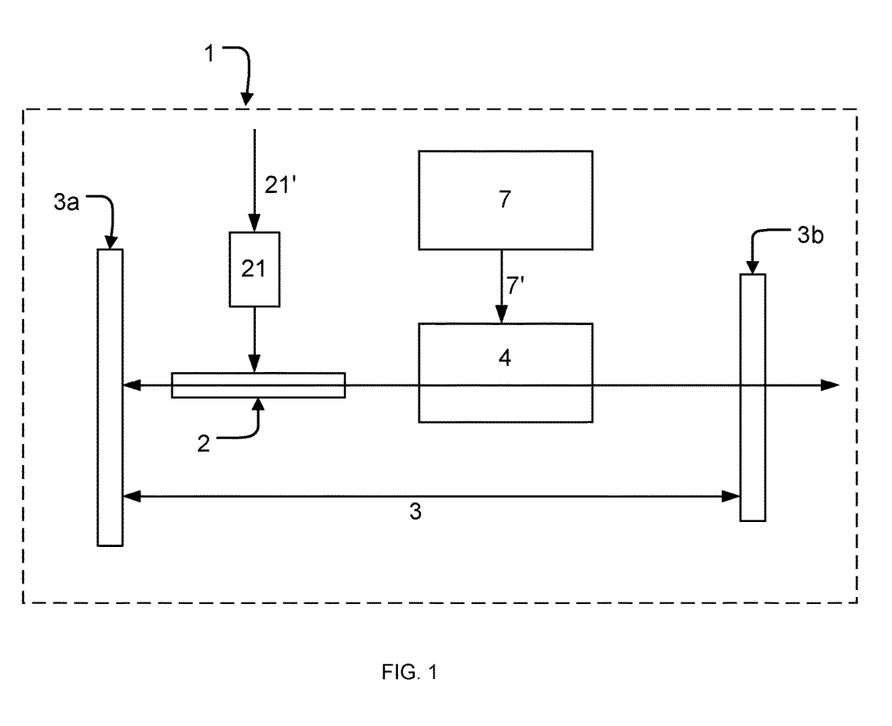
FIG. 1 illustrates a laser arrangement according to prior art.

An example of a laser arrangement 1 is illustrated in FIG. 1. Two mirrors 3a, 3b form the optical resonator 3, a gain medium 2 is arranged in the optical resonator which is excited by laser diodes 21. The gain medium is in this case a laser rod. The Q-switch 4 is arranged in the optical resonator to be able to prevent laser emission to resonate when set to high loss state. When the Q-switch is an acousto-optic Q-switch, it is set to a high loss state by an RF driver 7 which directs a radio frequency 7' at the Q-switch.

In a typical application of a laser rangefinder, the laser diodes are powered by a controlled current in the form of pulses with a pulse repetition frequency, PRF, which can be the same as the measuring frequency of the laser rangefinder. Every current pulse has an amplitude and/or duration which is variable depending on how much output energy the laser needs under the circumstances for the current lasing occasion. A variable measuring frequency leads to different temperatures in the laser arrangement and in particular in the gain material. The optical properties depend on the temperature and the efficiency and life span of the laser diodes are negatively affected by high temperatures. These problems caused by temperature have the effect that the output energy of the laser arrangement is unpredictable and hard to keep constant.

It is thus very hard to achieve a laser arrangement with controllable output energy independent of the pulse repetition frequency, PRF.

One example of solving this is to reach thermal equilibrium before initiating measurements with Q-switching is to pump the transmitter with maximum PRF and only activate the Q-switch with the desired PRF. A disadvantage with this method is high power consumption and a shorter life span of the laser diodes.

BRIEF SUMMARY

An object of the present disclosure is to provide a device and a method which seek to mitigate, alleviate, or eliminate one or more of the above-identified deficiencies in the art and disadvantages singly or in any combination.

In this disclosure, a solution to the problem outlined above is proposed. In the proposed solution, detection of a free running pulse is used to control an active Q-switch. The solution is based on the below described techniques that uses a photodetector to detect a free running pulse and a processing circuitry to control the active Q-switch and also the pumping of a gain medium. The device and method is for emitting controlled Q-switched laser emission.

The above objects are obtained by a laser arrangement, arranged to output energy in the form of laser emission, for emitting controlled Q-switched laser emission. The laser arrangement comprises a gain medium arranged to be excited when pumped, an optical resonator, an active Q-switch arranged in the optical resonator, said active Q-switch being controllable between at least a high loss state and a low loss state, and being arranged to introduce loss in the optical resonator to prevent lasing in the high loss state and to affect lasing minimally in the low loss state, a photodetector arranged to detect the presence of a free running pulse generated by the optical resonator and which occurs when a lasing threshold is reached and a processing circuitry arranged to control of the state of the active Q-switch based on the detection of the free running pulse. Since the free running pulse always occurs when the lasing threshold is reached, the detection can be seen as a measurement of the current state of the optical resonator. Controlling the state of the active Q-switch based on the detection therefore enables controlled Q-switched laser emission of the laser arrangement.

According to some aspects, the active Q-switch is an acousto-optic Q-switch or an electro-optic Q-switch. Acousto-optic Q-switches and electro-optic Q-switches are active Q-switches which are easily controllable.

According to some aspects, the photodetector is arranged in the optical resonator.

According to some aspects, the photodetector is arranged outside of the optical resonator.

According to some aspects, the optical resonator comprises a mirror that reflects part of the emission in the optical resonator towards the photodetector. A mirror is used so that the photodetector does not need to be placed in the way for the resonating emission in the optical resonator.

According to some aspects, the processing circuitry is arranged to control the state of the active Q-switch to the high loss state for a predetermined amount of time and thereby adding a predetermined amount of energy to the laser arrangement. Setting the active Q-switch to a high loss state for a predetermined time is the same as adding a predetermined amount of energy and therefor the output energy of the laser arrangement is predetermined.

According to some aspects, the processing circuitry is arranged to control the state of the active Q-switch to the low loss state. When the active Q-switch is controlled to the low loss state the laser arrangement will immediately emit a laser pulse. Since it is emitted when the free running pulse is detected, the output energy will be substantially the same every time this is performed.

The above objects of the disclosure are further obtained by a method in a laser arrangement for emitting controlled Q-switched laser emission. The laser arrangement is arranged to output energy in the form of laser emission and comprises a gain medium, an optical resonator, an active Q-switch arranged in the optical resonator, said active Q-switch being controllable between at least an high loss state and a low loss state, being arranged to introduce loss in the optical resonator to prevent lasing in the high loss state and to affect lasing minimally in the low loss state, a photodetector and a processing circuitry. The method comprises to initiate pumping of the gain medium, detecting, using the photodetector, the presence of a free running pulse generated by the optical resonator and which occurs when a lasing threshold is reached and controlling, using the processing circuitry, the state of the active Q-switch based on the detection of the free running pulse. The method has the same advantages as the laser arrangement since it is directed towards the same inventive concept.

According to some aspects, the controlling comprises to control the state of the active Q-switch to the high loss state.

According to some aspects, the controlling comprises to control the state of the active Q-switch to the high loss state for a predetermined amount of time and thereby adding a predetermined amount of energy to the laser arrangement.

According to some aspects, the method comprises controlling the state of the active Q-switch to a high loss state, using the processing circuitry, before detection of the free running pulse.

According to some aspects, the method comprising controlling the state of the active Q-switch to an intermediate high loss state, using the processing circuitry, before detection of the free running pulse.

According to some aspects, the controlling comprises to control the state of the active Q-switch to the low loss state.

According to some aspects, the method comprises to stop pumping the gain medium at the same time as the state of the active Q-switch is controlled to the low loss state. The laser arrangement will anyhow emit a laser pulse since the lasing threshold is reached. So power is saved by terminating pumping the gain medium.

According to some aspects, the active Q-switch is an acousto-optic Q-switch and wherein controlling the state of the active Q-switch comprises to control a radio frequency directed at the active Q-switch.

According to some aspects, the active Q-switch is an electro-optic Q-switch and wherein controlling the state of the active Q-switch comprises to control a voltage directed at the active Q-switch.

BRIEF DESCRIPTION OF THE FIGURES

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION OF VARIOUS EMBODIMENTS

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

In the present disclosure, detection of a free running pulse is used to control an active Q-switch. The solution is based on the below described techniques that uses a photodetector to detect a free running pulse and a processing circuitry to control the active Q-switch and also the pumping of a gain medium. The device and method is for emitting controlled Q-switched laser emission. In an example embodiment, the photodetector detects a free running pulse a time period after initiation of pumping of the gain medium. The time period depends of the setup of the laser arrangement. If the gain medium is for example Nd:YAG, the time period is about 150-200 μs and if the gain medium is for example Er:glass, the time period is in the ms scale. Since the free running pulse occurs when the lasing threshold is reached, the free running pulse will always occur under the same lasing conditions irrespective of for example internal temperature or worn components of the laser arrangement.

The detection of the free running pulse is then used to control an active Q-switch. The active Q-switch is for example set to a high loss state for a predetermined amount of time after the detection of the free running pulse. Since the gain medium is also pumped during that time, a predetermined amount of energy is added which is emitted as a laser pulse when the active Q-switch is set to low loss state after the predetermined amount of time.

Another example of the disclosure is that the active Q-switch is set to an intermediate high loss state before detecting the free running pulse. The detection of the free running pulse is then used to indicate when the active Q-switch should be set to a low loss state. The emitted laser pulse then occurs directly after the free running pulse has been detected and will also in this case be with an energy that can be foreseen.

Figure 2:
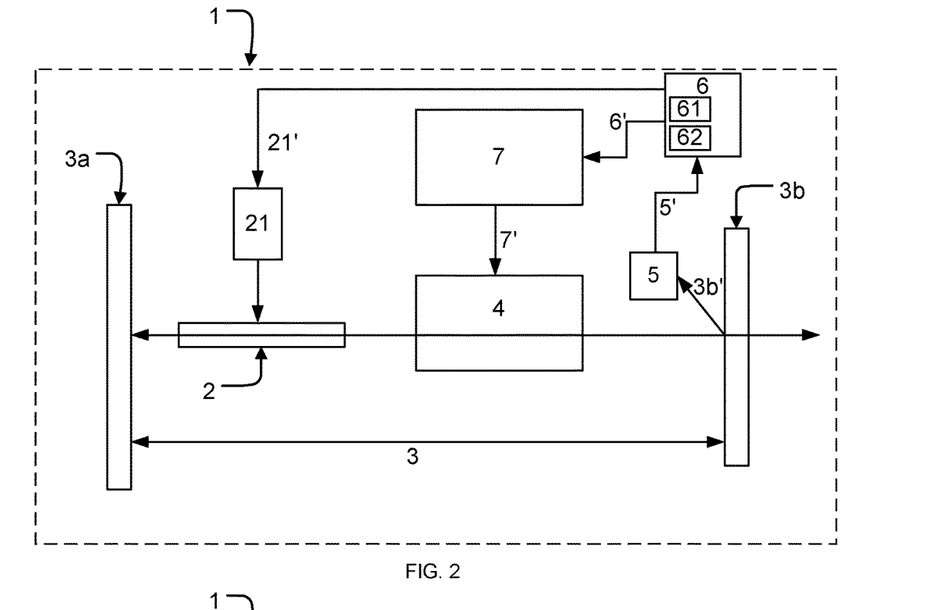
FIG. 2 illustrates an embodiment of a laser arrangement according to the present disclosure.
Figure 3:
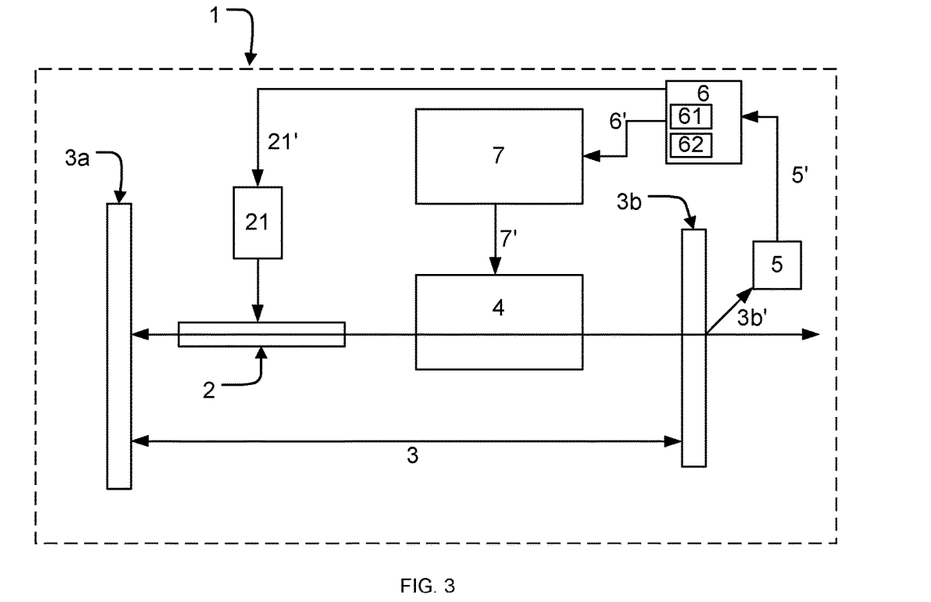
FIG. 3 illustrates a further embodiment of a laser arrangement according to the present disclosure.

FIGS. 2 and 3 illustrate two examples of laser arrangements according to some aspects of the disclosure. Specifically the figures illustrate a laser arrangement 1, arranged to output energy in the form of laser emission, for emitting controlled Q-switched laser emission. In the examples of the figures, the laser emission is emitted through the mirror 3b in the direction of the arrow. The mirror 3b is an output coupler, for example a partially transparent mirror.

The laser arrangement comprises a gain medium 2 arranged to be excited when pumped. The gain medium is for example pumped by a source of energy 21 such as laser diodes, a flash lamp or by an electric current. The pumping supplies the gain medium with energy. Pumping to supply the gain medium is known to the person skilled in the art.

The laser arrangement comprises an optical resonator 3. In the examples of FIGS. 2 and 3, the optical resonator comprises two mirrors 3a and 3b. Emission from the gain medium bounces back and forth between the mirrors and passes through the gain medium and is amplified each time. The optical resonator may be arranged/designed in different ways as long as it is an arrangement of optical components which allows for the emission to oscillate and/or resonate in a closed path. According to some aspects the optical resonator is either a linear resonator or a ring resonator.

An active Q-switch 4 is arranged in the optical resonator. The active Q-switch is controllable between at least a high loss state and a low loss state, and is arranged to introduce loss in the optical resonator to prevent lasing in the high loss state and to affect lasing minimally in the low loss state. An active Q-switch is a variable attenuator which prevents the emission of the gain medium to oscillate and/or resonate in its high loss state, i.e. to prevent feedback of the emission to the gain medium. That the active Q-switch affects lasing minimally in the low loss states means that since the active Q-switch is located in the optical resonator it will probably always affect lasing in some way by being present in the optical resonator, even if in a low loss state. Minimally therefore refers to that the active Q-switch does not introduce additional loss besides the introduced loss by having an active Q-switch in the optical resonator. In other words, in the low loss state, the active Q-switch affects lasing only by being present in the optical resonator and not by introducing additional loss.

A photodetector 5 is arranged to detect the presence of a free running pulse 1' generated by the optical resonator and which occurs when a lasing threshold is reached. Since the free running pulse always occurs when the lasing threshold is reached, the detection can be seen as a measurement of the current state of the optical resonator. The free running pulse will occur during pumping when the lasing threshold is reached. The photodetector can be any type of detector which can detect relevant electromagnetic energy. The type of photodetector should be chosen so that it can detect the photons with wavelengths relevant to the laser arrangement it will be used in. In other words, the photodetector should be chosen such that it can detect the free running pulse of the laser arrangement.

The position of the photodetector must be such that it can detect the free running pulse. There are several options to achieve enablement of the detection. According to some aspects, the photodetector 5 is arranged in the optical resonator 3; for example as illustrated in FIG. 2. However, the photodetector should not disturb the resonance of emission in the optical resonator. For example a mirror directs part of the emission towards the photodetector. According to some aspects, the photodetector 5 is arranged outside of the optical resonator 3; for example as illustrated in FIG. 3. It should be noted that in FIGS. 2 and 3, no additional mirror is illustrated. In the figures it is the mirror 3b of the optical resonator that is arranged such that part of the emission is directed at the photodetector. This is not necessary but is used as an example set up. Thus, according to some aspects, the optical resonator 3 comprises a mirror 3a, 3b that reflects part of the emission in the optical resonator towards the photodetector 5. The mirror is a separate mirror or part of one of the mirrors of the optical resonator. A mirror is used so that the photodetector does not need to be placed in the way for the resonating emission in the optical resonator. It should be noted that the photodetector can be arranged anywhere in the laser arrangement as long as it can detect the free running pulse and such that it does not obstruct the laser function of the lasing arrangement.

Figure 4:
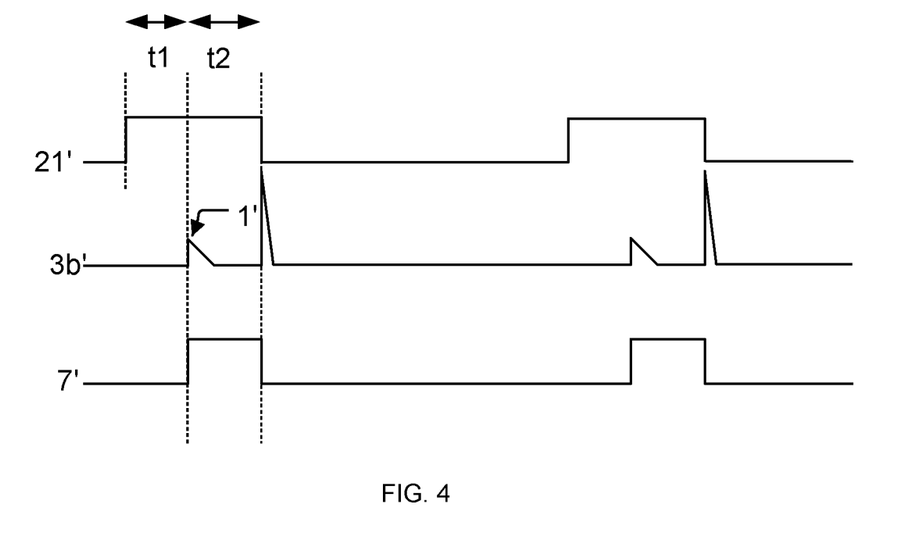
FIG. 4 illustrates the current to the laser diodes, the detected light in the detector and activation of the radio frequency directed at the Q-switch according to some aspects of the disclosure.
Figure 5:
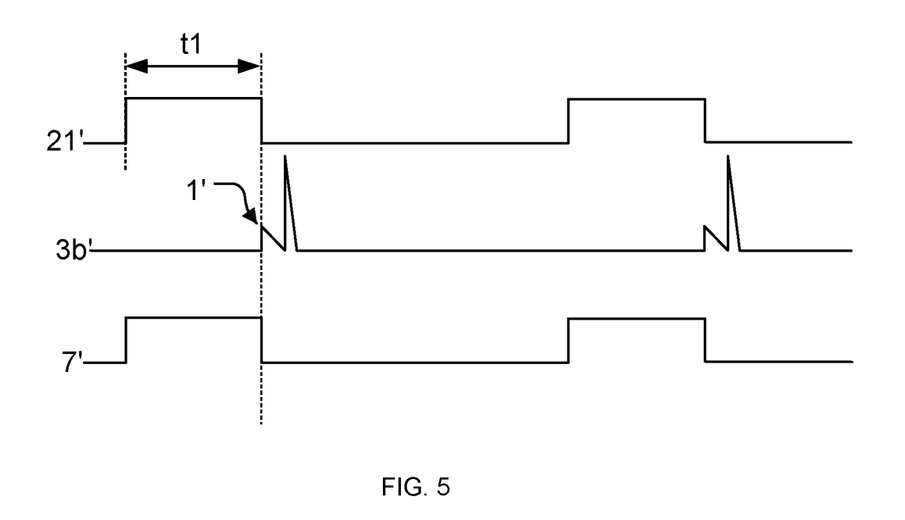
FIG. 5 illustrates the current to the laser diodes, the detected light in the detector and activation of the intermediate radio frequency directed at the Q-switch according to some aspects of the disclosure.

FIGS. 4 and 5 illustrate two examples of different embodiments of the disclosure. The top line is a current 21' to the source of energy 21 pumping the gain medium, the middle line is the emission 3b' detected by the photodetector 5 and the bottom line is the activation level 7' of the Q-switch where a low line is a low loss state and a higher line is a state in either high loss state or an intermediate high loss state. 1' indicates the free running pulse.

A processing circuitry 6 is arranged to control S4 of the state of the active Q-switch based on the detection of the free running pulse. The emitted laser radiation is thus controlled. In FIGS. 2 and 3, the photodetector 5 detects the free running pulse 1' and sends a signal 5' to the processing circuitry 6. The processing circuitry then controls the active Q-switch by for example sending a signal 6' to a Q-switch driver 7. Controlling the state of the active Q-switch based on the detection therefore enables controlled Q-switched laser emission of the laser arrangement. In this way, changes in the laser efficiency is compensated for by detecting laser threshold for the free running laser emission and after that adding certain amount of input energy to the laser arrangement. The purpose is to achieve stabilized Q-switched output pulse energy.

The present disclosure also discloses a method in a laser arrangement 1 for emitting controlled Q-switched laser emission. The laser arrangement is arranged as described above and the method comprises to initiate pumping S1 of the gain medium 2, detecting S3, using the photodetector 5, the presence of a free running pulse 1' generated by the optical resonator and which occurs when a lasing threshold is reached and controlling S4, using the processing circuitry 6, the state of the active Q-switch based on the detection of the free running pulse. The method has the same advantages as the laser arrangement since it is directed towards the same inventive concept. According to some aspects, it is the processing circuitry 6 that controls the pumping S1, the photodetector 5 and the state of the Q-switch. According to some aspects the processing circuitry comprises a controller 61 for controlling pumping and a controller 62 for controlling the state of the active Q-switch. In other words, according to some aspects, the processing circuitry controls the current 21' to the source of energy for pumping the gain medium. According to some aspects, the current 21' is controlled in both time and amplitude.

Figure 6:
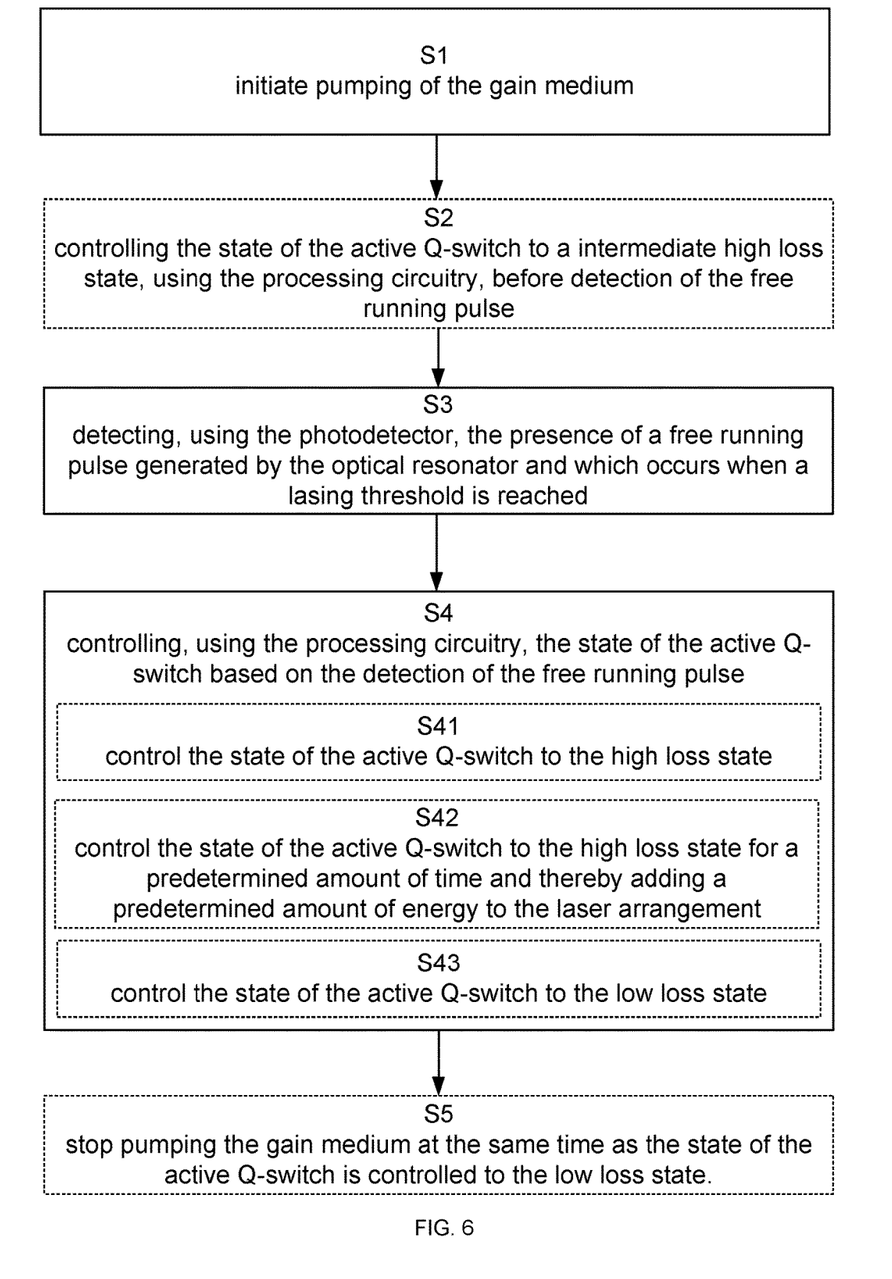
FIG. 6 is a flow chart illustrating the proposed method, performed in the laser arrangement.

The method is illustrated in FIG. 6 where the boxes with full lines are the method steps of the broadest embodiment as described above. The dashed boxes represent steps which are taken in exemplary embodiments as described below.

The active Q-switch 4 is for example an acousto-optic Q-switch or an electro-optic Q-switch. Acousto-optic Q-switches and electro-optic Q-switches are active Q-switches which are easily controllable. An acousto-optic Q-switch is driven by directing a radio frequency, RF, 7' at the Q-switch. The Q-switch driver 7 is then a RF driver. An electro-optic Q-switch is driven by a voltage 7' and the Q-switch driver is then a voltage source.

When the active Q-switch is an acousto-optic Q-switch, the controlling S4 of the state of the active Q-switch comprises to control a radio frequency RF 7' directed at the active Q-switch.

When the active Q-switch is an electro-optic Q-switch, the controlling S4 of the state of the active Q-switch comprises to control a voltage 7' directed at the active Q-switch.

It should be noted that controlling a radio frequency or a voltage directed at the active Q-switch may be done by starting a Q-switch driver 7 or by opening a shutter for allowing an already activated RF or voltage to reach the Q-switch.

The active Q-switch may be any controllable active Q-switch. A person skilled in the art realises that as long as the active Q-switch is controllable between at least a high loss state and a low loss state it can be used within the inventive concept of the disclosure. It should also be noted that the active Q-switch 4 and the Q-switch driver 7 illustrated in FIGS. 2 and 3 are only for illustrative purposes and may contain more components or be placed differently, this is also clear to a skilled person.

As previously stated, FIGS. 4 and 5 illustrates two examples of how to control the active Q-switch based on the free running pulse. According to some aspects, the processing circuitry 6 is arranged to control S4 the state of the active Q-switch to the high loss state for a predetermined amount of time and thereby adding a predetermined amount of energy to the laser arrangement. Setting the active Q-switch to a high loss state for a predetermined time is the same as adding a predetermined amount of energy and therefor the output energy of the laser arrangement is predetermined. Thus, according to some aspects, the controlling S4 comprises to control S41 the state of the active Q-switch to the high loss state. Additionally, the controlling S4 comprises to control S42 the state of the active Q-switch to the high loss state for a predetermined amount of time and thereby adding a predetermined amount of energy to the laser arrangement. This is illustrated in FIG. 4 where the gain medium is pumped for a time t1 and then the photodetector detects the free running pulse 1' and the Q-switch is set to a high loss state for a time t2. When the Q-switch is then turned off at t2, the output pulse will have a stabilized energy. The predetermined amount of time is for example set beforehand or calculated just before the detection of the free running pulse. The predetermined time will depend on the amount of energy the user of the laser arrangement wants in the output pulse.

In FIG. 5 it is illustrated a case where the active Q-switch is controlled to a low loss state when the free running pulse is detected. According to some aspects, the processing circuitry 6 is arranged to control the state of the active Q-switch to the low loss state. When the active Q-switch is controlled to the low loss state, the laser arrangement will emit a laser pulse. Since it is emitted when the free running pulse is detected, the output energy will be substantially the same every time this is performed.

In the case of FIG. 5, the Q-switch has been controlled to a high loss state before detection of the free running pulse. Thus, according to some aspects, the method comprises controlling S2 the state of the active Q-switch to a high loss state, using the processing circuitry, before detection S3 of the free running pulse. The high loss state does not have to be a maximum high loss state. To allow for a free running pulse to occur, the loss state of the active Q-switch may be set to an intermediate high loss state; that means an increased lasing threshold due to higher losses in the optical resonator. In such an intermediate high loss state the radio frequency directed at the Q-switch, in the case of an acousto-optic Q-switch, is set to an intermediate radio frequency. According to some aspects, the method comprising controlling the state of the active Q-switch to an intermediate high loss state, using the processing circuitry, before detection of the free running pulse. Thus, according to some aspects, the controlling S4 comprises to control S43 the state of the active Q-switch to the low loss state. In this example, the gain medium is pumped for a time period t1 before the free running pulse is detected. As previously explained, the time period depends for example on the type of gain medium used.

According to some aspects, the method comprises to stop pumping S5 the gain medium at the same time as the state of the active Q-switch is controlled S4 to the low loss state. At the same time here does not necessarily mean the exact same point in time. It may be just before or just after the point in time when the Q-switch is controlled to the low loss state. At the same time therefore for example refers to substantially the same time. The laser arrangement will anyhow emit a laser pulse since the lasing threshold is reached. So power is saved by stopping the pumping of the gain medium. Another option is to pump the gain medium for a predetermined amount of time.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A laser arrangement (1), arranged to output energy in the form of laser emission, for emitting controlled Q-switched laser emission, the arrangement comprising:
   a gain medium (2) arranged to be excited when pumped;
   an optical resonator (3);
   an active Q-switch (4) arranged in the optical resonator, said active Q-switch (4) being controllable between at least a high loss state and a low loss state, and being configured to introduce loss in the optical resonator to prevent lasing in the high loss state and to affect lasing minimally in the low loss state;

a photodetector (5) configured to detect the presence of a free running pulse (1') generated by the optical resonator and which occurs when a lasing threshold is reached; and a processing circuitry (6) configured to control (S4) of the state of the active Q-switch based on the detection of the free running pulse.

2. The laser arrangement according to claim 1, wherein the active Q-switch (4) is either an acousto-optic Q-switch or an electro-optic Q-switch.

3. The laser arrangement according to claim 1, wherein the photodetector (5) is arranged in the optical resonator (3).

4. The laser arrangement according to claim 1, wherein the photodetector (5) is arranged outside of the optical resonator (3).

5. The laser arrangement according to claim 1, wherein the optical resonator (3) comprises a mirror (3a, 3b) that reflects part of the emission in the optical resonator towards the photodetector (5).

6. The laser arrangement according to claim 1, wherein the processing circuitry (6) is configured to control (S4) the state of the active Q-switch to the high loss state for a predetermined amount of time and thereby adding a predetermined amount of energy to the laser arrangement.

7. The laser arrangement according to claim 1, wherein the processing circuitry (6) is configured to control the state of the active Q-switch to the low loss state.

8. A method in a laser arrangement (1) for emitting controlled Q-switched laser emission, the method comprising the steps of:

providing a laser arrangement comprising:
a gain medium (2);
an optical resonator (3);
an active Q-switch (4) arranged in the optical resonator, said active Q-switch (4) being controllable between at least an high loss state and a low loss state, and being configured to introduce loss in the optical resonator to prevent lasing in the high loss state and to affect lasing minimally in the low loss state;
a photodetector (5); and
a processing circuitry (6);

initiating pumping (SI) of the gain medium (2);
detecting (S3), using the photodetector (5), the presence of a free running pulse (1') generated by the optical resonator and which occurs when a lasing threshold is reached; and
controlling (S4), using the processing circuitry (6), the state of the active Q-switch based on the detection of the free running pulse.

9. The method according to claim 8, wherein the controlling (S4) step comprises to control (S41) the state of the active Q-switch to the high loss state.

10. The method according to claim 8, wherein the controlling (S4) step comprises to control (S42) the state of the active Q-switch to the high loss state for a predetermined amount of time and thereby adding a predetermined amount of energy to the laser arrangement.

11. The method according to claim 8, further comprising the step of controlling (S2) the state of the active Q-switch to a high loss state, using the processing circuitry, said controlling (S2) step occurring before detection (S3) of the free running pulse.

12. The method according to claim 8, further comprising the step of controlling (S2) the state of the active Q-switch to an intermediate high loss state, using the processing circuitry, said controlling (S2) step occurring before detection (S3) of the free running pulse.

13. The method according to claim 11, wherein the controlling (S4) step comprises control (S43) of the state of the active Q-switch to the low loss state.

14. The method according to claim 8, further comprising a step of stopping pumping (S5) the gain medium at the same time as the state of the active Q-switch is controlled to the low loss state.

15. The method according to claim 8, wherein:
the active Q-switch is an acousto-optic Q-switch; and
controlling (S4) the state of the active Q-switch comprises controlling a radio frequency (7') directed at the active Q-switch.

16. The method according to claim 8, wherein:
the active Q-switch is an electro-optic Q-switch; and
controlling (S4) the state of the active Q-switch comprises controlling a voltage (7') directed at the active Q-switch.

* * * * *